United States Patent
Koyama

(10) Patent No.: US 8,316,891 B2
(45) Date of Patent: Nov. 27, 2012

(54) HYDRAULIC PRESSURE APPARATUS AND BRAKE PRESSURE CONTROL APPARATUS USING THE SAME

(75) Inventor: Fumitoshi Koyama, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 110 days.

(21) Appl. No.: 12/795,051

(22) Filed: Jun. 7, 2010

(65) Prior Publication Data

US 2010/0313560 A1   Dec. 16, 2010

(30) Foreign Application Priority Data

Jun. 10, 2009   (JP) ................................ 2009-138750

(51) Int. Cl.
*F16L 55/05*   (2006.01)
*B60T 13/14*   (2006.01)

(52) U.S. Cl. .......................................... 138/31; 60/585
(58) Field of Classification Search .................... 138/31; 60/585
See application file for complete search history.

(56) References Cited

U.S. PATENT DOCUMENTS

| | | | | |
|---|---|---|---|---|
| 3,191,536 A | * | 6/1965 | Taylor | 138/31 |
| 3,672,402 A | * | 6/1972 | Bloemer | 138/31 |
| 4,538,972 A | * | 9/1985 | Gooden | 417/540 |
| 5,148,834 A | * | 9/1992 | Reinartz et al. | 138/31 |
| 6,203,117 B1 | * | 3/2001 | Starr et al. | 303/87 |
| 6,390,133 B1 | | 5/2002 | Patterson et al. | |

FOREIGN PATENT DOCUMENTS

JP    2001-328526 A    11/2001
JP    2005-212035 A    8/2005

* cited by examiner

*Primary Examiner* — James Hook
(74) *Attorney, Agent, or Firm* — Buchanan Ingersoll & Rooney PC

(57) ABSTRACT

An open port is provided on an inner peripheral surface of the cylinder bore of the reservoir apparatus and the port is exposed to the exterior of the reservoir apparatus. A hollow portion is formed concentrically with the port on a reservoir body. An annular thin portion is formed between the inner peripheral surface of the cylinder bore and the hollow portion surrounding the port in a radial direction. The thin portion is outwardly deflected and deformed by being pushed outwardly in a radial direction centering on the port in a range narrower than the inner diameter of the hollow portion. Thus, the opening of the port is outwardly sunk from the inner peripheral surface of the cylinder bore thereby to form a curved surface at a root portion of the thin portion on the inner peripheral surface of the cylinder bore.

11 Claims, 5 Drawing Sheets ic pressure apparatus and brake pressure control apparatus using the same

INCORPORATION BY REFERENCE

This application claims priority under 35 U.S.C. Sec. 119 to No. 2009-138750 filed in Japan on Jun. 10, 2009, the entire content of which is herein incorporated by reference.

BACKGROUND OF THE INVENTION

1. Field of the Invention

This invention relates to a hydraulic pressure apparatus having an open port at an inner peripheral surface of a cylinder and a brake pressure control apparatus using the hydraulic pressure apparatus.

2. Discussion of the Related Art

As a hydraulic pressure apparatus of the type above, an accumulator, which is used in a hydraulic pressure brake system (for example, the accumulator disclosed in JP2001-328526 A), has been known. According to this accumulator, a cylinder bore is provided in a housing body and a piston is slidably disposed in the cylinder bore. An accumulator chamber is formed between one side of the piston and the cylinder bore.

On the other hand, the other side of the piston, which is located opposite to the accumulator chamber, is provided with a spring chamber, into which the atmospheric pressure is introduced through a passage formed on the housing body. The piston is always biased towards the accumulator chamber side by a spring provided in the spring chamber. The spring chamber, into which the atmospheric pressure is introduced, is in communication with the passage through a fine bore.

The fine bore is formed by punching out an inner peripheral surface of the spring chamber with a punch having a curved surface at the root of a punching portion. An opening portion of the fine bore to the spring chamber is formed with the curved surface (chamfered surface) around the opening portion by transferring the curved surface shape of the punch to the opening portion at the same time the fine bore is formed. According to this method, no burr is formed at the opening portion to the spring chamber and any damage to a sealing member can be prevented by smoothly passing the same over through the opening portion upon assembling the piston into the cylinder bore.

Further, a burr removing technology is disclosed, for example, in JP2005-212035 A when any burr is generated at the opening portion of the machined bore. JP2005-212035 A discloses a burr removing tool having an operating shaft, a grip for holding formed on one end of the shaft and a blade member pivotally mounted on the other end of the shaft at a pivotal point. The blade member is formed with a tapered blade portion on a rotation shaft having a predetermined length.

According to the burr removing tool disclosed in JP2005-212035A, the burr at the opening portion is removed by rotating the pivotal point around the center of opening portion with pressing or pushing the tapered blade portion against the opening portion. Thus the blade portion is rotated along the opening portion to remove the burr which has been generated at the opening portion.

According to the accumulator disclosed in JP2001-328526 A, if the inner diameter of the fine bore is equal to or less than a predetermined value, the possible damage of the sealing member can be reduced upon inserting the sealing member into the cylinder bore. This is a certain advantage achieved by the effect of the curved surface formed on the opening portion. However, if the diameter of the opening formed at the inner peripheral surface of the spring chamber is larger than the predetermined value, the sealing member made of a rubber material may enter into the inside of the opening and not so much effects were proved regarding the prevention of damage to the sealing member.

Removing the burr at the opening potion with the burr removing tool disclosed in JP2005-212035 A, requires an extra time or man-hour for removing the burrs, and is not sufficient to make the shape of the opening portion as to prevent the damage of the sealing member. Further, it takes much time or man-hour to remove the burrs dropped from the opening portion into the housing body. This was not an effective way to trim the shape of the opening portion.

SUMMARY OF THE INVENTION

The present invention was made in consideration with the above problems and the object of the invention is to provide a hydraulic pressure apparatus which can reduce any abrasion and damage to the sealing member caused by the opening formed on the cylinder through which the sealing member passes and a brake pressure control apparatus using the same.

Briefly, according to the present invention, there is provided an improved hydraulic pressure apparatus comprising: a cylinder formed at a housing; a port open to an inner peripheral surface of the cylinder and communicating with an exterior of the cylinder; a plunger member having a sealing member installed on an outer peripheral surface thereof and liquid-tightly and axially movably inserted into the cylinder, whereby the sealing member is passable over an opening of the port on the cylinder upon an axial movement of the plunger; and a pressure chamber formed between the cylinder and the plunger member into which a hydraulic pressure is introduced, wherein the housing includes: a hollow portion in communication with the port, extending outwardly in a radial direction from the port and cylindrically and concentrically formed with the port, the hollow portion having a diameter larger than an inner diameter of the port, and an annular thin portion formed between the inner peripheral surface of the cylinder and the hollow portion and surrounding the port in a radial direction, and wherein the annular thin portion is deformed by outward deflection by being pushed outwardly in a radial direction of the cylinder from an inside of the cylinder centering on the port, within an area having a diameter smaller than the inner diameter of the hollow portion and wherein the opening of the port sinks outwardly from the inner peripheral surface of the cylinder, thereby to form a curved surface at a root portion of the thin portion on the inner peripheral surface of the cylinder.

In the present invention defined above, since the annular thin portion is deformed by outward deflection by being pushed outwardly in a radial direction of the cylinder from an inside of the cylinder and the opening of the port sinks outwardly from the inner peripheral surface of the cylinder, thereby to form a curved surface at a root portion of the thin portion on the inner peripheral surface of the cylinder, abrasion and damage of a sealing member installed on a plunger member can be reduced.

Further there is provided an improved brake pressure control apparatus comprising: a master cylinder for generating hydraulic pressure upon operation of an operator of a vehicle; a wheel brake to which the hydraulic pressure from the master cylinder is supplied; a reservoir apparatus receiving brake fluid discharged from the wheel brake; and a hydraulic pressure pump for returning the brake fluid discharged to the reservoir apparatus to the master cylinder, wherein the reservoir apparatus is formed with the above-mentioned hydraulic pressure apparatus and includes a biasing means for pushing the plunger member towards the pressure chamber, and wherein the brake fluid in the wheel brake is discharged to the pressure chamber and an atmospheric pressure is introduced from the outside through the port on a back side of the plunger member located opposite side to the pressure chamber.

According to the brake pressure control apparatus, since the reservoir apparatus is formed according to the hydraulic pressure apparatus of the invention, any abrasion or damage of the sealing member included in the reservoir apparatus generated upon the passing through the port which is in communication with the atmospheric pressure can be reduced.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

Figure 1:
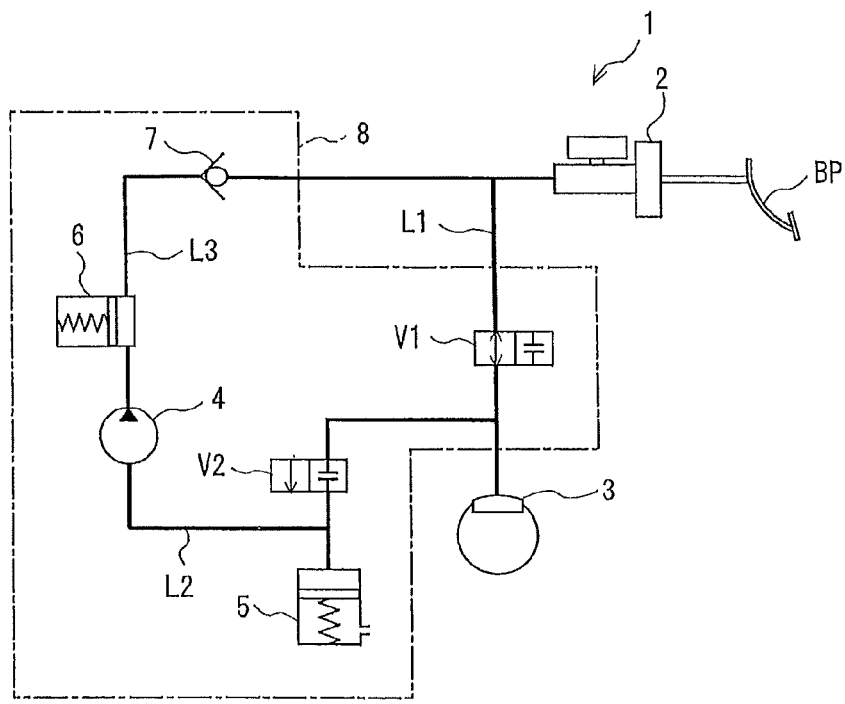
FIG. 1 is a view showing a brake pressure control apparatus, to which a reservoir apparatus according to an embodiment of the invention is installed.

A reservoir apparatus 5 (a hydraulic pressure apparatus) of an embodiment of the invention will be explained hereinafter with reference to FIGS. 1 through 8 of the attached drawings. FIG. 1 indicates a brake pressure control apparatus 1 to be installed in a vehicle. The brake pressure control apparatus 1 is structured to be able to perform anti-skid control in addition to a normal braking operation. A master cylinder 2 is installed into an engine compartment of the vehicle (not shown) and is connected to a brake pedal BP. The master cylinder 2 generates brake pressure upon depression of the brake pedal BP by an operator of the vehicle.

The master cylinder 2 is connected to a wheel cylinder 3 (a wheel brake) through a main conduit L1. The wheel cylinder 3 is installed in each of four vehicle wheels and applies braking force to the vehicle wheel upon supply of the brake fluid pressure from the master cylinder 2. It is noted here that the wheel cylinders 3 are installed in the respective vehicle wheels, although only one of the wheel cylinders 3 is indicated in FIG. 1.

A pressure increase valve V1 is disposed in the main conduit L1. The pressure increase valve V1 is a normally open type electromagnetic valve and is kept in open state under normal braking operation. When the brake pressure control apparatus 1 is in anti-skid operation condition, the pressure increase valve V1 appropriately is closed to interrupt fluid communication between the master cylinder 2 and the wheel cylinders 3.

A suction port of a hydraulic pressure pump 4 is connected to the wheel cylinder 3 through a circulation conduit L2 and a discharge port of the hydraulic pressure pump 4 is connected to the master cylinder 2 through a return conduit L3. The reservoir apparatus 5 is provided in the circulation conduit L2. A pressure decrease valve V2 is disposed in the circulation conduit L2 between the wheel cylinder 3 and the reservoir apparatus 5.

The pressure decrease valve V2 is a normally closed type electromagnetic valve and is kept in closed state under normal braking operation to interrupt fluid communication between the wheel cylinder 3 and the reservoir apparatus 5. When the brake pressure control apparatus 1 initiates an anti-skid control operation and the brake pressure of the wheel cylinder 3 needs to be decreased, the pressure decrease valve V2 is opened to establish fluid communication between the wheel cylinder 3 and the reservoir apparatus 5 to discharge brake fluid in the wheel cylinder 3 to the reservoir apparatus 5.

The hydraulic pump 4 is driven by an electric motor. The pump 4 suctions and returns the brake fluid discharged into the reservoir apparatus 5 to the master cylinder 2.

A damper 6 is provided in the return conduit L3 for reducing the hydraulic pressure pulsation caused by the operation of the hydraulic pump 4. A one-way valve 7 is provided in the return conduit L3 between the damper 6 and the master cylinder 2 for preventing brake fluid from flowing from the master cylinder 2 in the damper 6 direction. The components, hydraulic pump 4, the reservoir apparatus 5, the damper 6, the one-way valve 7, the pressure increase valve V1 and the pressure decrease valve V2 are integrally formed as a unit to form a hydraulic pressure control unit 8.

Next, the detail structure of the reservoir apparatus 5 will be explained with reference to FIG. 2 and FIG. 3 of the attached drawings. A reservoir body 51 (a housing) forms a portion of the unit housing (not shown) of a hydraulic pressure control unit 8. The reservoir body 51 is provided with a cylinder bore 511 (a cylinder). In this embodiment, the reservoir body is made of an aluminum alloy, however the material is not limited to this and any other material, such as casting iron, can be used to form the reservoir body.

A reservoir piston 52 (a plunger member) is disposed in the cylinder bore 511 and is slidable therein in an axial direction. The reservoir piston 52 includes a piston body 521 made of a carbon steel or an aluminum alloy. A sealing groove 521a having a rectangular shape in cross section is provided on and along an outer peripheral surface of the piston body 521 to be formed annularly. An O-ring 522 (a sealing member) made of a synthetic rubber material with heat resistance property is inserted in the sealing groove 521a so that the reservoir piston 52 can be disposed in the cylinder bore 511 to be in liquid-tight relative thereto. Accordingly, a hydraulic chamber 53 (a pressure chamber) is formed between the cylinder bore 511 and the reservoir piston 52. Further, a slide guide 523 made of a synthetic resin material is installed on an outer peripheral surface of the piston body 521.

A ring shaped attaching groove 512 is formed at an opening portion of the cylinder 511. A disc shaped spring retainer 54 is inserted into the attaching groove 512 at an outer peripheral end and is fixed thereto by caulking. A holding portion 541 is formed on one side surface of the retainer 54 opposing the reservoir piston 52 and is projected towards the reservoir piston 52.

On the other hand, a cylindrically recessed portion 521b is provided on the piston body 521 at the spring retainer 54 side and the recessed portion 521b includes an engaging portion 521c at the bottom thereof. The engaging portion 521c projects from the bottom. A piston spring 55 (a biasing means) is disposed between the holding portion 541 of the spring retainer 54 and the engaging portion 521c of the piston body 521 and both ends of the piston spring 55 are respectively engaged with the holding portion 541 and the engaging portion 521c. The piston spring 55 is disposed between the spring retainer 54 and the reservoir piston with pre-loaded so that the piston spring 55 always biases the reservoir piston 52 towards the hydraulic pressure chamber 53 side.

A discharge passage 513 is provided in a bottom portion of the cylinder bore 511 and is in communication with the circulation conduit L2 shown in FIG. 1. Accordingly, the brake pressure in the wheel cylinder 3 is discharged to the hydraulic pressure chamber 53 through the discharge passage 513. The hydraulic pump 4 suctions the brake fluid in the hydraulic pressure chamber 53 through the discharge passage 513.

An air chamber 56 is formed at the back surface of the reservoir piston 52 positioned at the opposite side relative to the hydraulic pressure chamber 53. A port 514 is formed at the inner peripheral surface 511a of the cylinder bore 511 and is open for communication with the air chamber 56 (See FIG. 3). The O-ring 522 passes through an opening 514a of the port 514 when the reservoir piston 52 is inserted into the cylinder bore 511 upon assembling of the reservoir apparatus 5.

A hollow portion 515 is provided in the cylinder body 51 to be positioned outwardly in a radial direction of the cylinder bore 511 relative to the port 514. The hollow portion 515 is in communication with the port and extends cylindrically and outwardly from the port 514. The hollow portion 515 is formed concentrically with the port 514 having a diameter Ds larger than an inner diameter Dp of the port 514 (relationship "Dp<Ds" as shown in FIG. 3). According to the embodiment, the outer peripheral surface of the cylinder body 51 is spot-faced centering on the axial center of the port 514 to make the hollow portion 515, but not limited to this method.

Figure 3:
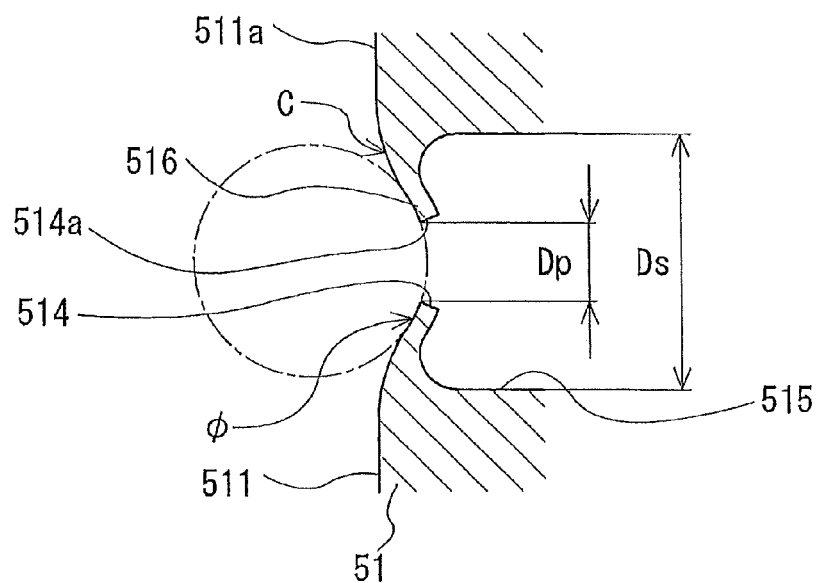
FIG. 3 is an enlarged partial view showing the main part of the reservoir apparatus in FIG. 2.

As shown in FIG. 3, an annular thin portion 516 is formed between an inner peripheral surface 511a of the cylinder bore 511 and the hollow portion 515, surrounding the port 514 in a radial direction. As will be explained later, by pushing the thin portion 516 outwardly in a radial direction from the inside of the cylinder bore 511, the thin portion 516 is deformed by outward deflection and the opening 514a of the port 514 is sunk outwardly from the inner peripheral surface 511a of the cylinder bore 511. At the same time a curved surface C is formed at the root area of the thin portion 516 on the inner peripheral surface 511a of the cylinder bore 511. Further, an outwardly projected spherical surface Φ is formed on the outwardly deflected thin portion 516.

Figure 2:
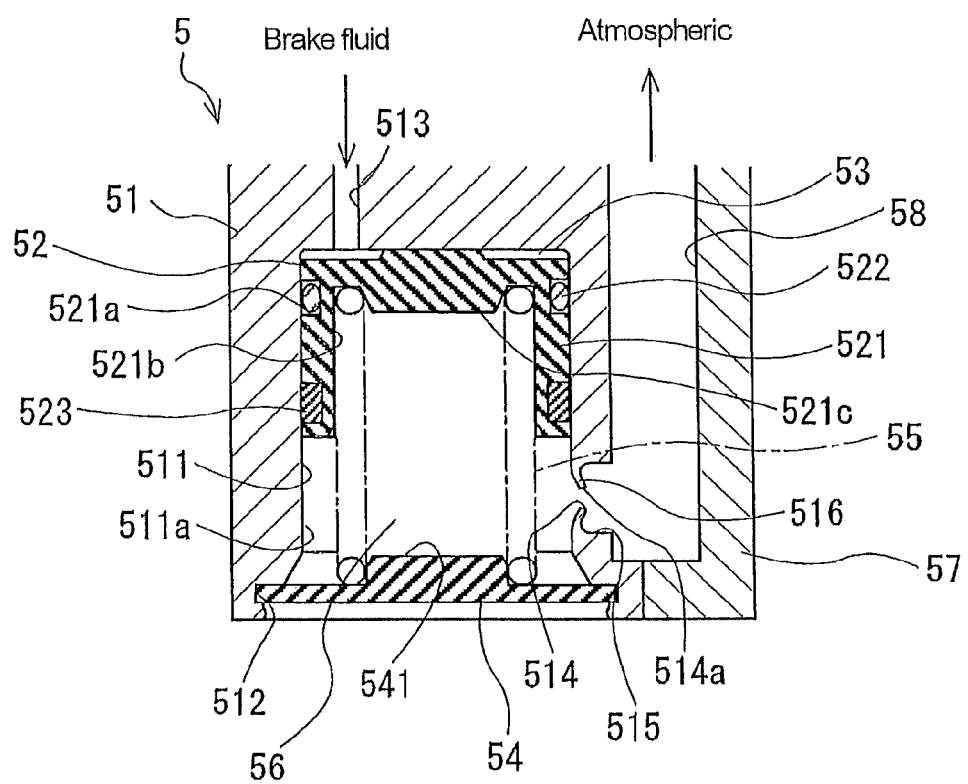
FIG. 2 is a cross sectional view of the reservoir apparatus shown in FIG. 1.

As shown in FIG. 2, an atmospheric pressure supply passage 58 is formed by installing a case 57 on the outer peripheral surface of the reservoir body 51 to be in fluid communication with the hollow portion 515. The atmospheric pressure supply passage 58 is designed to introduce the atmospheric pressure into the air chamber 56 through the hollow portion 515 and the port 514 by communication with the exterior of the reservoir apparatus 5.

Next, a press apparatus 100 for pushing the thin portion 516 will be explained with reference to FIG. 4. The press apparatus 100 includes an electric motor 101 or a press actuator 101 operable hydraulically or pneumatically and a controller 102 for controlling the operation of the press actuator 101. A stay member 103 is installed on a housing of the press actuator 101 to be movable in an axial direction (right/left directions as viewed in FIG. 4). A steel ball 104 (a pushing member) is attached to one end of the stay member 103 and movable integrally with the stay member 103. As a matter of fact, the steel ball 104 has a spherical outer surface. Instead of using such steel ball, another member, such as for example, a semispherical ball can be attached to the stay member 103 as long as such member has a spherical outer surface portion which serves as the portion to push the thin portion 516.

A position sensor 105 is attached to one end of the housing of the press actuator 101, while a detecting body 106 of the position sensor 105 is attached to the stay member 103 to detect the displacement of the steel ball 104 by the position sensor 105. As the position sensor 105, a Hall element type magnetic sensor may be used, but it is not limited thereto. The controller 102 is connected to the press actuator 101 and the position sensor 105 to control the displacement amount and the displacement speed of the press actuator 101 based on the detected displacement amount of the steel ball by the position sensor 105.

Figure 4:
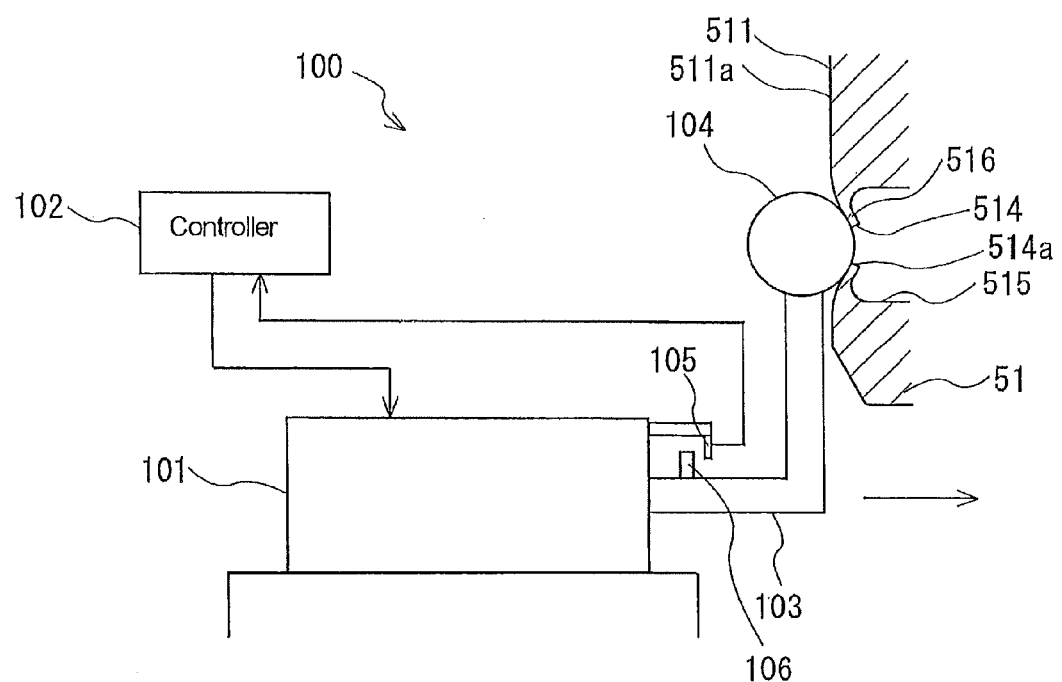
FIG. 4 is a simplified view of a pushing apparatus which pushes a port opening.

As shown in FIG. 4, under the state that the steel ball 104 is inserted into the cylinder bore 511 together with the tip end of the stay member 103, the press actuator 101 is operated with a predetermined displacement speed and amount. By this operation, the steel ball 104 pushes the thin portion 516 outwardly relative to the cylinder bore 511 centering on the axial center of the port 514.

According to the press apparatus 100 explained above, the steel ball 104 is designed to move linearly together with the stay member 103, however, the steel ball 104 can be pushed relative to the thin portion 516 by swinging or rotating the stay member centering on a predetermined position.

Figure 5:
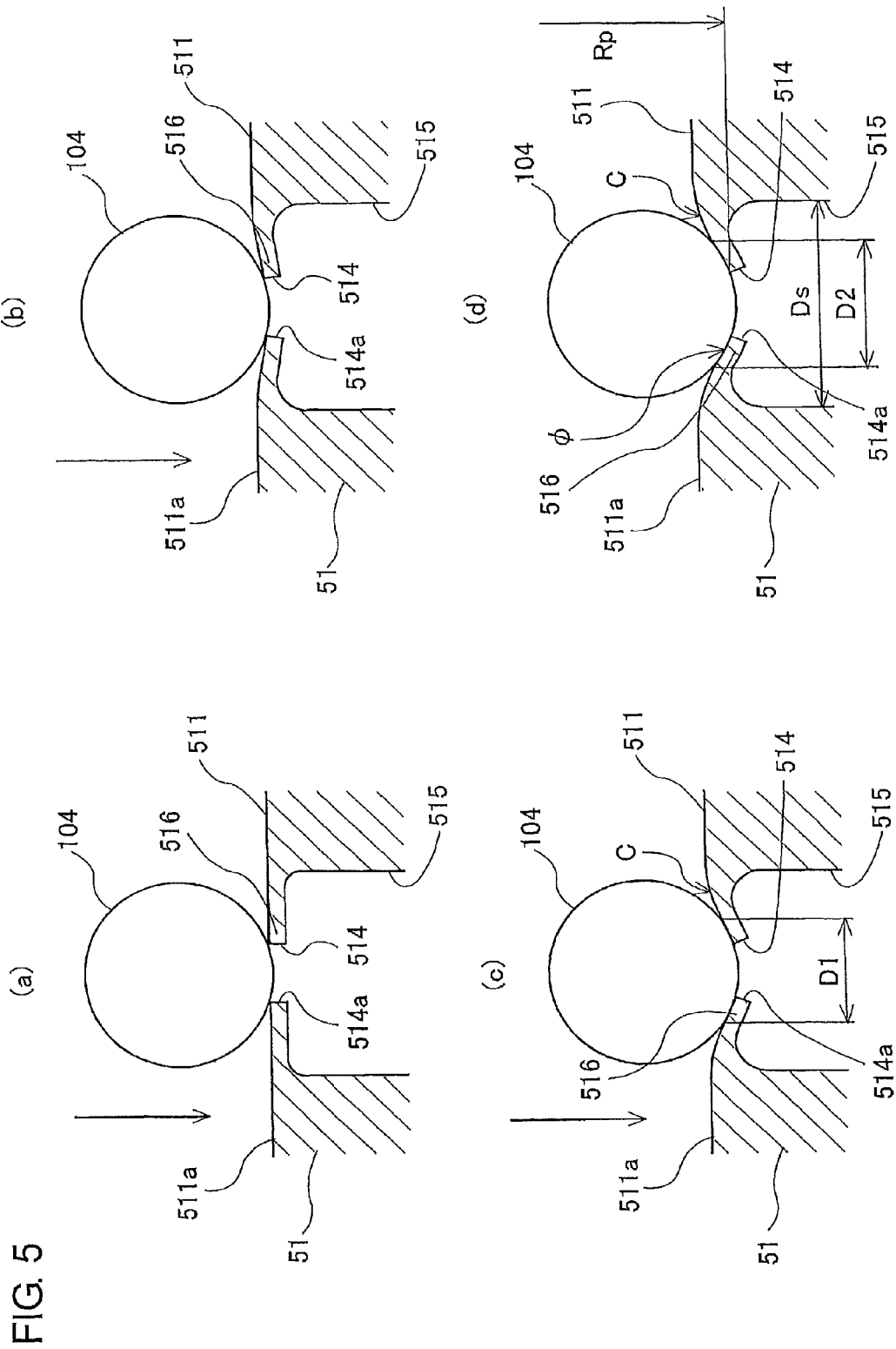
FIG. 5(a) shows a first pushing stage of a pushing step by the pushing apparatus.
FIG. 5(b) shows a second pushing stage thereof.
FIG. 5(c) shows a third pushing stage thereof.
FIG. 5(d) shows a fourth pushing stage thereof.
Figure 6:
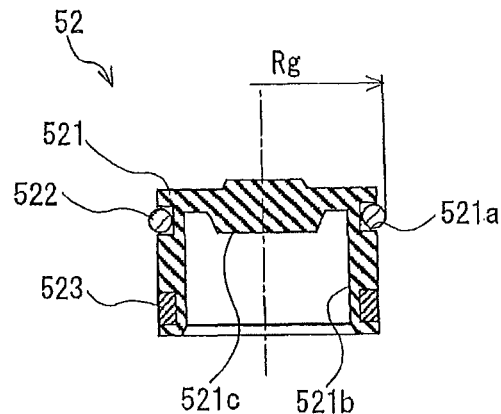
FIG. 6 is a cross sectional view of a reservoir piston before being disposed in a cylinder bore.

Next, pushing step of the thin portion 516 by means of the press apparatus 100 will be explained with reference to FIG. 5. It should be noted here that the pushing direction of the steel ball 104 is illustrated to be a downward direction for convenience of explanation in every drawing in FIG. 5(a) through 5(d) and the direction indicated here is different from the direction of actually operated case. The up/down direction used hereafter in explanation is based on the direction as viewed in the drawings.

As the first stage of the pushing step, the steel ball 104 of the press apparatus 100 is provided on the thin portion 516 formed on the inner peripheral surface 511a of the cylinder bore 511 (FIG. 5(a)). The center of the steel ball 104 is arranged to be on the axial centerline of the opening 514a of the port 514.

Next, as the second stage of the pushing step, the press actuator 101 is operated to initiate the downward pushing of the thin portion 516 by the steel ball 104 (FIG. 5(b)). The steel ball 104 pushes the thin portion 516 centering on the axial center of the opening 514a of the port 514 to thereby initiate deformation of the thin portion 516 by downward deflection (plastic deformation).

Next, as the third stage, the pushing force on the thin portion 516 by the steel ball 104 is further increased and the deflection deformation of the thin portion 516 further progresses accordingly (FIG. 5(c)). During this process, the curved surface C is formed at the root portion or area of the thin portion 516 on the inner peripheral surface 511a of the cylinder bore 511. Further, the area where the steel ball 104 pushes the thin portion 516 (circularity area having diameter D1 in FIG. 5(c)) is gradually increased.

Next, as the fourth stage of pushing step, when the pushing amount of the steel ball 104 to the thin portion 516 reaches a predetermined value, the operation of the press apparatus 100 stops. In this stage, the thin portion 516 is deflected and deformed such that the deflection of a portion of the thin portion 516 becomes gradually larger as the portion approaches closer to the opening 514a. The opening 514a sinks downwardly from the inner peripheral surface 511a of the cylinder bore 511 (FIG. 5(d)).

The pushing amount of the steel ball 104 to push the thin portion 516 is set to the value where the opening 514a does not contact the O-ring 522 during the insertion of the reservoir piston 52 into the cylinder bore 511. For example, the radial position (indicated as Rp in FIG. 5(d)) of the opening 514a of the port 514 relative to the axial center of the cylinder bore 511 is further outwardly positioned than the radial position (indicated as Rg in FIG. 6) of the edge of the outer peripheral surface of the O-ring 522 installed on the piston body 521, but not engaged with the cylinder bore 511 relative to the axial center of the reservoir piston 52 (Rg<Rp). The pushing amount of the steel ball 104 to the thin portion 516 can be set to satisfy the above condition.

Different from the method above, first, O-ring 522 shape after the reservoir piston 52 being inserted into the cylinder bore 511 is obtained by an analysis such as FEM (Finite Element Method) and based on the analysis results, the pushing amount of the steel ball 104 to the thin portion 516 can be set not to have the O-ring to be in contact with the opening 514a.

At the completion of the pushing step, the area where the steel ball 104 pushes the thin portion 516 (the area of circle having the diameter D2 illustrated in FIG. 5(d)) reaches the maximum value. The diameter D2 of the area is set to be smaller than the inner diameter Ds of the hollow portion 515. Thus, by setting the diameter of the circular area of pushing to be smaller than the inner diameter of the hollow portion 515, the predetermined shaped smooth curved surface C can be obtained at the root portion of the thin portion 516, thereby to prevent generation of any bent portion. Further, outer profile of the steel ball 104 is transferred on the outwardly deflected thin portion 516 to form a downwardly projecting spherical surface Φ.

As stated above, by properly setting the amount of pushing the thin portion 516 downward, the area of pushing the thin portion 516 can be adjusted to form the smooth curved surface C at the root portion of the thin portion 516. Thus, the opening 514a can sink downward from the inner peripheral surface 511a of the cylinder bore 511 so as not to be in contact with the O-ring 522. The pushing amount to push the thin portion 516 necessary for agreeing the area of pushing the thin portion 516 to the preset amount may be experimentally obtained.

Figure 7:
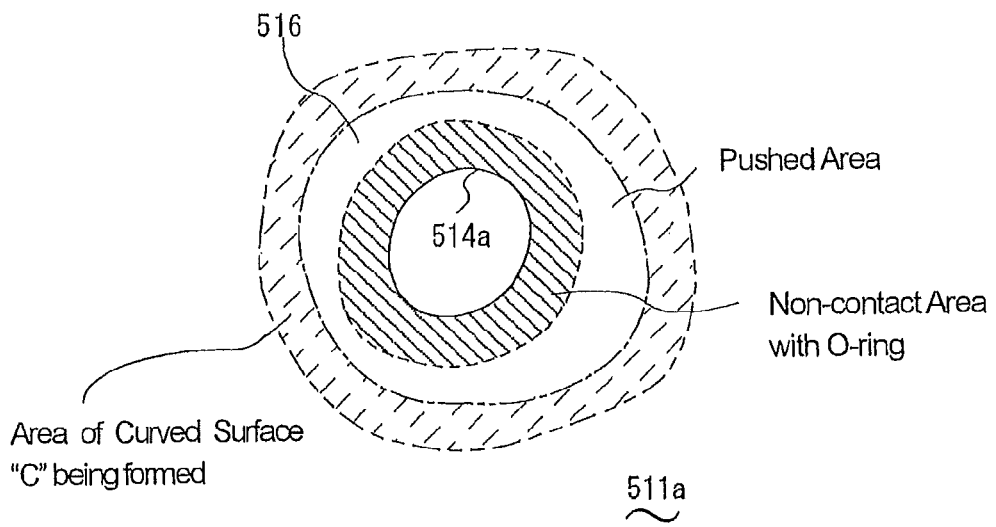
FIG. 7 is a view of vicinity of the port viewed in an axial centerline direction of the port after an experimental pushing step has been carried out.
Figure 8:
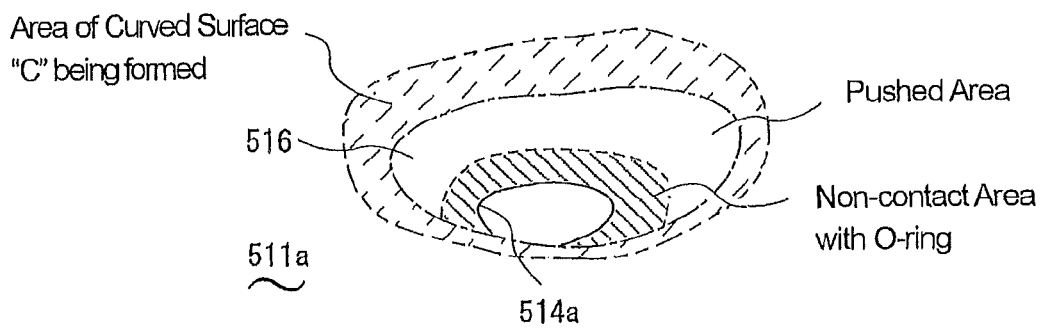
FIG. 8 is a perspective view of the vicinity of the port after the pushing step has been carried out.

Next, the experimental results, which the inventor of this invention obtained by experiment, will be explained with reference to FIGS. 7 and 8 of the attached drawings. First, the inventor experimentally pushed the thin portion 516 formed at the cylinder bore 511 by the steel ball 104 and then inserted the reservoir piston 52, on which the O-ring has been installed, into the cylinder bore 511. Before insertion of the reservoir piston 52 into the cylinder bore 511, coloring agent was applied in the vicinity of the opening 514a of the port 514. Then the reservoir piston 52 was inserted into the cylinder bore 511 and the inventor observed the area where the coloring agent had been wiped off by the O-ring 522 and confirmed the contact area of the O-ring 522 on the inner peripheral surface 511a of the cylinder bore 511.

As shown in Figures, the coloring agent remained at the area around the opening 514a of the port 514 and accordingly, the inventor confirmed that the O-ring 522 had not been in contact with the opening 514a upon insertion of the reservoir piston 52 into the cylinder bore 511. Further, a smooth curved surface C was seen at the outer peripheral portion outside the pushing area of the steel ball 104 to the thin portion 516.

According to the embodiment of the invention, the thin portion 516 is pushed outwardly in a radial direction from the inside of the cylinder bore 511 and deformed by outward deflection. Then the opening 514a of the port 514 sinks outwardly from the inner peripheral surface 511a of the cylinder bore 511. A curved surface is formed at the root portion of the thin portion 516 at the inner peripheral surface 511a of the cylinder bore 511. This will reduce abrasion and damage of the O-ring 522 installed on the reservoir piston 52.

In other words, when the thin portion 516 is pushed centering on the port 514, the thin portion 516 is deflected outwardly and the deflection of a potion of the thin portion 516 becomes gradually larger as the potion approaches closer to the opening 514a and irrespective of the size of the diameter of the port 514, the O-ring 522 installed on the reservoir piston 52 would not be in contact with the opening 514a upon the O-ring 522 passing the opening 514a to surely reduce the abrasion and the damage of the O-ring 522.

Further, by pushing the thin portion 516, the outer surface of the thin portion 516 as a whole becomes smooth, which further reduces the damage of the O-ring 522.

Still further, by only pushing the thin portion 516 the abrasion and the damage of the O-ring 522 can be reduced and accordingly, there is no need to perform cutting work on the opening 514a of the port 514 and no need to collect burrs dropped inside of the cylinder thereby to provide an improved reservoir apparatus 5 which is easy to be produced and has a high productivity.

Further, by positioning the opening 514a of the port 514 further outwardly in a radial direction than the position of the edge of the outer peripheral surface of the O-ring 522 installed on the reservoir piston 52 but before the insertion into the cylinder bore 511, the O-ring 522 is set not to contact with the opening 514a upon passing thereof to surely reduce abrasion and damage of the O-ring 522.

Further, by providing the pushing member for pushing the thin portion 516 with a spherical shape to evenly push the thin portion 516, it is possible to ease the outward sinking of the opening 514.

Further, by forming the hollow portion 515 by spot facing the outer peripheral surface of the reservoir body 51, the inner diameter of the hollow portion 515 and the thickness of the thin portion 516 can be precisely achieved.

Still further, by adopting the hydraulic pressure apparatus according to the invention to the reservoir apparatus 5 of the brake pressure control apparatus 1, any abrasion or damage of the O-ring 522 included in the reservoir apparatus 5, which is generated upon the O-ring 522 passing through the port 514 in communication with the atmospheric pressure, can be reduced.

(First Modified Embodiment)

Figure 9:
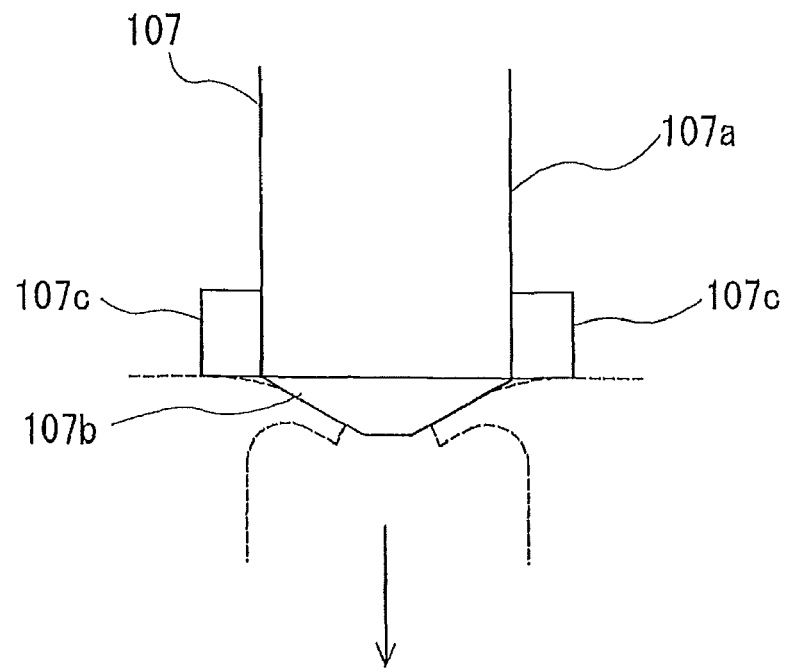
FIG. 9 is a side view of a pushing member according to a first modified embodiment.

The pushing member according to the first modified embodiment will be explained with reference to FIG. 9 of the attached drawings. A punch 107 used as a pushing member for pushing the thin portion 516 includes a column-shaped main body 107a, a tapered or cone-shaped contact portion 107b formed at a tip end of the main body 107a and a pair of plate-shaped stoppers 107c projecting from the outer peripheral surface of the main body 107a.

The punch 107 is installed to the press apparatus 100 and is operated to push the thin portion 516 at the contact portion 107b provided at the tip end of the main body 107a by moving in an axial direction. After the pushing operation of the punch 107 to the thin portion 516 is progressed, the contact of the stoppers 107c with the inner peripheral surface 511a of the cylinder bore 511 is detected and then the operation of the press apparatus 100 is stopped. The position of the stoppers 107c of the punch 107 can be properly determined considering the amount of pushing the thin portion 516 downwardly.
(Second Modified Embodiment)

Figure 10:
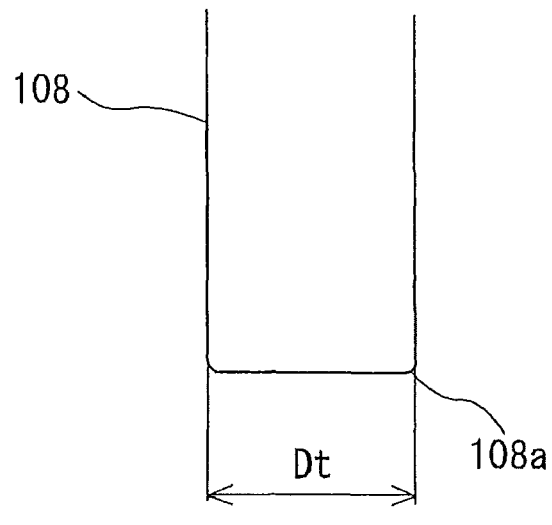
FIG. 10 is a side view of a pushing member according to a second modified embodiment.

The pushing member according to the second modified embodiment will be explained with reference to FIG. 10 of the attached drawings. A punch 108 used as a pushing member is formed with a column-shaped as is similar to the main body of the first modified embodiment. A tip end of the punch 108 is formed with a flat shape surface and is slightly roundedly chamfered at the corner (R chamfer) 108a thereof. The punch 108 is also installed on the press apparatus 100 and pushes the thin portion 516 at the roundedly chambered corner 108a by moving in an axial direction.

According to the modified embodiment, since the punch 108 for pushing the thin portion 516 is formed in column-shape and the punch 108 pushes the thin portion 516 at the roundedly chamfered corner 108a by moving in an axial direction, the pushing area of the thin portion 516 can be easily adjusted by setting the diameter Dt of the punch 108 in cross section to a predetermined value.
(Other Embodiments)

This invention is not limited to the above embodiments, but other modifications or extensions below can be made. This invention is not limited to the reservoir apparatus, but can be used for other hydraulic pressure apparatuses, such as for example, master cylinder apparatus, wheel cylinder apparatus, electromagnetic valve, or accumulator, etc.

The invention can be adapted to a brake pressure control apparatus which can achieve traction control or vehicle stability control, in addition to the anti-skid control.

O-ring is used as a sealing member in the embodiments explained above, but other sealing members, such as a cup seal with a lip on outer peripheral portion or square ring may be used.

According to the above-mentioned embodiments, the abrasion and damage of the O-ring 522 is reduced when the O-ring 522 passes the port 514 upon insertion of a reservoir piston 52 into a cylinder bore 511. However, the invention can also is useful for reducing the damages which may be generated upon a sealing member such as O-ring passes the port when the plunger member such as a piston receives the hydraulic pressure and slides within the cylinder bore.

Obviously, numerous further modifications and variations of the present invention are possible in light of the above teachings. It is therefore to be understood that within the scope of the appended claims, the present invention may be practiced otherwise than as specifically described herein.

What is claimed is:

1. A hydraulic pressure apparatus comprising:
a cylinder formed at a housing; a port open to an inner peripheral surface of the cylinder and communicating with an exterior of the cylinder;
a plunger member having a sealing member installed on an outer peripheral surface thereof and liquid-tightly and axially movably inserted into the cylinder, whereby the sealing member is passable over an opening of the port on the cylinder upon an axial movement of the plunger; and
a pressure chamber formed between the cylinder and the plunger member into which a hydraulic pressure is introduced, wherein the housing includes:
a hollow portion in communication with the port, extending outwardly in a radial direction from the port and cylindrically and concentrically formed with the port, the hollow portion having a diameter larger than an inner diameter of the port, and
an annular thin portion formed between the inner peripheral surface of the cylinder and the hollow portion and surrounding concentrically the port in a radial direction, wherein the annular thin portion is deformed by outward deflection by being pushed outwardly in a radial direction of the cylinder from an inside of the cylinder centering on the port, within an area having a diameter smaller than the inner diameter of the hollow portion and wherein the opening of the port sinks outwardly from the inner peripheral surface of the cylinder, thereby to form a curved surface concentrically with the port at a root portion of the thin portion on the inner peripheral surface of the cylinder.

2. The hydraulic pressure apparatus according to claim 1, wherein a position of the opening of the port relative to an axial center of the cylinder is located further outwardly in a radial direction than a position of the edge of an outer peripheral surface of the sealing member installed on the plunger member before being inserted into the cylinder.

3. The hydraulic pressure apparatus according to claim 1, wherein a pushing member is provided for pushing the annular thin portion and the pushing member has at least a spherical shaped pushing portion to push the annular thin portion.

4. The hydraulic pressure apparatus according to claim 1, wherein a pushing member is provided for pushing the annular thin portion and has a column shape to push the annular thin portion at an end portion thereof by moving in an axial direction.

5. The hydraulic pressure apparatus according to claim 1, wherein the hollow portion is formed on an outer peripheral surface of the housing by spot facing machining.

6. A brake pressure control apparatus comprising:
a master cylinder for generating hydraulic pressure upon operation of an operator of a vehicle;
a wheel brake to which the hydraulic pressure from the master cylinder is supplied;
a reservoir apparatus receiving brake fluid discharged from the wheel brake; and
a hydraulic pressure pump for returning the brake fluid discharged to the reservoir apparatus to the master cylinder, wherein the reservoir apparatus is formed with the hydraulic pressure apparatus according to claim 1 and includes a biasing means for pushing the plunger member towards the pressure chamber, and wherein the brake fluid in the wheel brake is discharged to the pressure chamber and an atmospheric pressure is introduced from the outside through the port on a back side of the plunger member located opposite side to the pressure chamber.

7. A hydraulic pressure apparatus comprising:
a housing in which is formed a bore surrounded by an axially extending side wall and possessing an inner peripheral surface;
a port passing through the axially extending side wall, the port opening to the inner peripheral surface of the bore and communicating exterior of the bore;

a plunger member axially movably positioned in the bore in a liquid-tight manner, the plunger member possessing an outer circumferential surface extending between opposite axial ends of the plunger member, the plunger member having a sealing member installed on the outer circumferential surface of the plunger member, the sealing member being passable over an opening of the port upon axial movement of the plunger; and a pressure chamber between the inner peripheral surface of the bore and the plunger member into which hydraulic pressure is introduced, wherein the housing includes:
- a hollow portion in communication with the port, the hollow portion extending radially outwardly from the port and being cylindrically shaped with an axis of the cylindrical shape concentric with the port, the hollow portion having a diameter larger than an inner diameter of the port, and
- an annular thin portion between the inner peripheral surface of the bore and the hollow portion and surrounding concentrically the port in a radial direction, the annular thin portion being deformed outwardly in a radial direction of the bore from an inside of the bore centering on the port, within an area having a diameter smaller than the inner diameter of the hollow portion and wherein the opening of the port sinks outwardly from the inner peripheral surface of the bore to thereby form a curved surface concentric with the port at a root portion of the thin portion on the inner peripheral surface of the bore.

8. The hydraulic pressure apparatus according to claim 7, wherein a position of the opening of the port relative to an axial center of the cylinder is located further outwardly in a radial direction than a position of the edge of an outer peripheral surface of the sealing member installed on the plunger member before being inserted into the cylinder.

9. The hydraulic pressure apparatus according to claim 7, wherein a pushing member is provided for pushing the annular thin portion and the pushing member has at least a spherical shaped pushing portion to push the annular thin portion.

10. The hydraulic pressure apparatus according to claim 7, wherein a pushing member is provided for pushing the annular thin portion and has a column shape to push the annular thin portion at an end portion thereof by moving in an axial direction.

11. The hydraulic pressure apparatus according to claim 7, wherein the hollow portion is formed on an outer peripheral surface of the housing by spot facing machining.

* * * * *